H. HELLER.
ANTISKID DEVICE.
APPLICATION FILED APR. 17, 1919.

1,312,729.

Patented Aug. 12, 1919.

Inventor
H. Heller
By Attorneys

UNITED STATES PATENT OFFICE.

HENRY HELLER, OF WINONA, MINNESOTA.

ANTISKID DEVICE.

1,312,729.  Specification of Letters Patent.  Patented Aug. 12, 1919.

Application filed April 17, 1919. Serial No. 290,804.

*To all whom it may concern:*

Be it known that I, HENRY HELLER, a citizen of the United States, residing at Winona, in the county of Winona and State of Minnesota, have invented certain new and useful Improvements in Antiskid Devices, of which the following is a specification.

This invention relates to improvements in anti-skid devices for vehicle wheels and more particularly to that type comprising a series of flexible members adapted to be easily attached to pneumatic tires of automobiles to prevent skidding of the vehicle.

One of the objects of the present invention is to provide a strong and durable anti-skid device of the above general character which may be easily and quickly applied to vehicle wheels. A further object is to provide a device of the above character which will be simple in construction and inexpensive to manufacture. A further object is to provide an anti-skid device which will be of great efficiency.

Other objects will be in part obvious from the annexed drawings and in part indicated in connection therewith by the following analysis of this invention.

This invention accordingly consists in the features of construction, combination of parts and in the unique relations of the members and in the relative proportioning and disposition thereof; all as more completely outlined herein.

Figure 1:
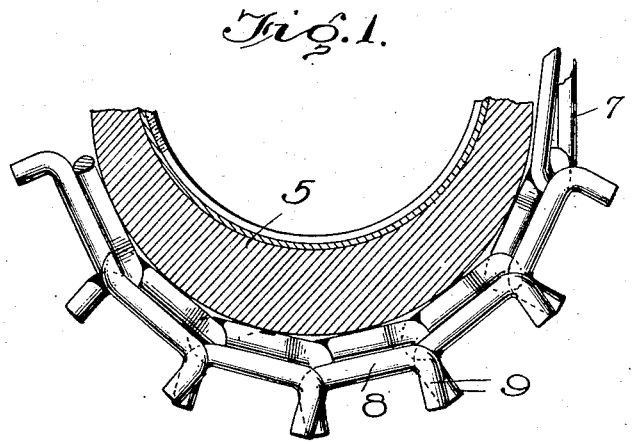
Figure 1 is a cross sectional view showing a portion of a tire and a part of the anti-skid device.
Figure 2:
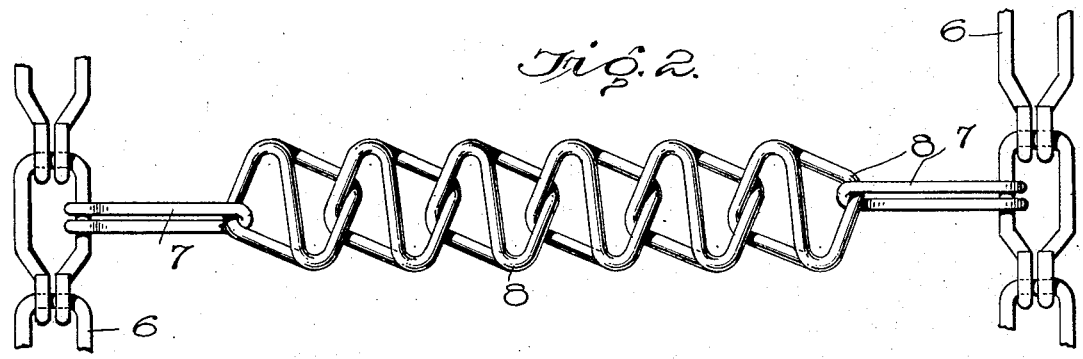
Fig. 2 is a fragmentary view showing one of the transverse members and two longitudinal members of the device.
Figure 3:
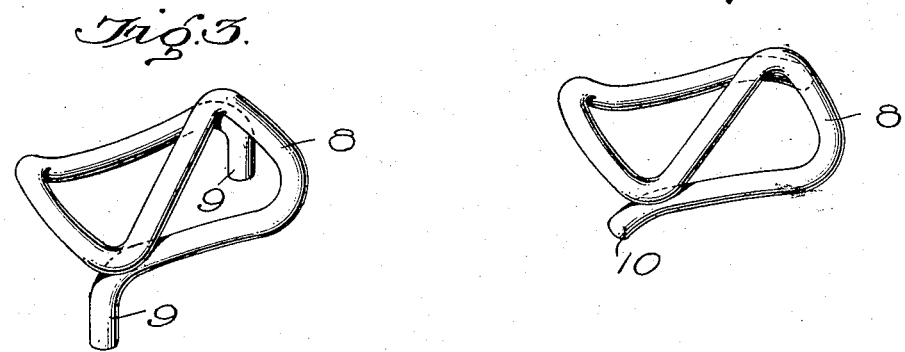
Fig. 3 is a perspective view of one of the links.
Figure 4:
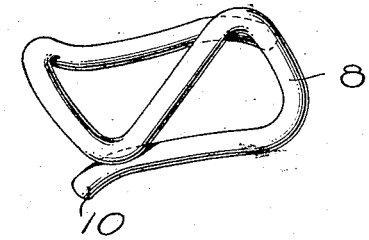
Fig. 4 is a similar view showing a slight modification.

Referring now to the drawings in detail, 5 denotes a section of a pneumatic tire of any desired type to which the anti-skid device or chain, as will be hereinafter referred to, is applied. This chain which is the general arrangement known as the "Weed chain" comprises two longitudinally disposed members or chains 6 adapted to extend circumferentially about the tire and of slightly less maximum diameter than the tire. The ends of the chain are provided with suitable coactive fasteners of any desired type and it is believed to be unnecessary to show them in this application as the parts are all of well known construction. At regular intervals, say four or five inches, are disposed a series of transverse chains 7 shown in Fig. 2, each of which comprises a series of interlocking links 8, as shown in detail in Fig. 3. These links might be termed to be of general S-shape construction having elongated free ends 9 extending at substantially right angles to the plane of the link. As these links are not of the endless or annular type, a certain amount of yieldability exists thereby preventing breakage when subjected to sudden and severe strains. These ends, it is to be noted in Fig. 1, are adapted to extend downwardly from the tread of the tire to form a gripping engagement with the road. The amount to which the projecting ends 9 are bent may be varied at will and as shown in Fig. 4 the ends 10 extend at an angle of only about 30°. In clay roads the form shown in Fig. 3 would be more desirable while on asphalt or on concrete roads generally existing in cities, the form shown in Fig. 4 would be preferred. These projections 9 not only perform the function of giving greater efficiency against skidding, but also protect the links of the chain from wear, thus increasing the durability of the device as a whole.

The free ends 9 of the links are disposed angularly to the body portions thereof and to each other, thus affording two gripping contacts on different longitudinal and transverse lines and greatly increasing the efficiency of the device in the prevention of side slip or skidding.

From the above, it will be seen that the present invention provides a simple and practical anti-skid chain of strong and durable construction designed to increase the efficiency of the device and also prolong its life as the connecting links are thoroughly protected against wear.

I realize that considerable variation is possible in the details of construction, thus specifically shown and described, and I do not intend by illustrating a single specific embodiment of my invention to be limited thereto, my invention being in the following claims to claim protection upon all the novelty there may be in my invention, as fully as the state of the art will permit.

I claim:

1. In an anti-skid device, in combination, a flexible member adapted to extend transversely across the tread of the tire, said member comprising a series of links of general S-shape construction having elongated free ends angularly disposed to the body portion of the link and diagonally to each other.

2. In an anti-skid device, in combination, a flexible member adapted to extend transversely across the tread of the tire, said member comprising a series of links of general S-shape construction, the free ends of said links being angularly disposed to the body portions thereof and diagonally to each other and turned downwardly to present a gripping engagement with the road.

3. In an anti-skid device, in combination, a flexible member adapted to extend transversely across the tread of the tire, said member comprising a series of links of general S-shape construction, the free ends of said links being angularly disposed to the body portions thereof and diagonally to each other and bent downwardly at substantially 90°, thereby to increase the anti-skidding effect and prevent wear of the body portions of the links.

4. In a device of the character described, in combination, a pair of longitudinal members adapted to extend circumferentially about the tire and transverse members connecting said longitudinal members, said transverse member comprising a series of links of general S-shape construction having elongated free ends angularly disposed to the body portions thereof and diagonally to each other.

5. In a device of the character described, in combination, a pair of longitudinal members adapted to extend circumferentially about the tire and transverse members connecting said longitudinal members, said transverse member comprising a series of links of general S-shape construction, the ends of said links being angularly disposed relative to the body portions thereof and diagonally to each other and bent downwardly from the plane of the links thereby to present a better gripping surface with the road.

In testimony whereof I affix my signature in presence of two witnesses.

HENRY HELLER.

Witnesses:
E. D. LIBERA,
W. J. SMITH.